No. 691,797. Patented Jan. 28, 1902.
T. W. NORMAN.
MACHINE FOR MAKING ROPES.
(Application filed Mar. 16, 1891.)
(No Model.) 9 Sheets—Sheet 2.
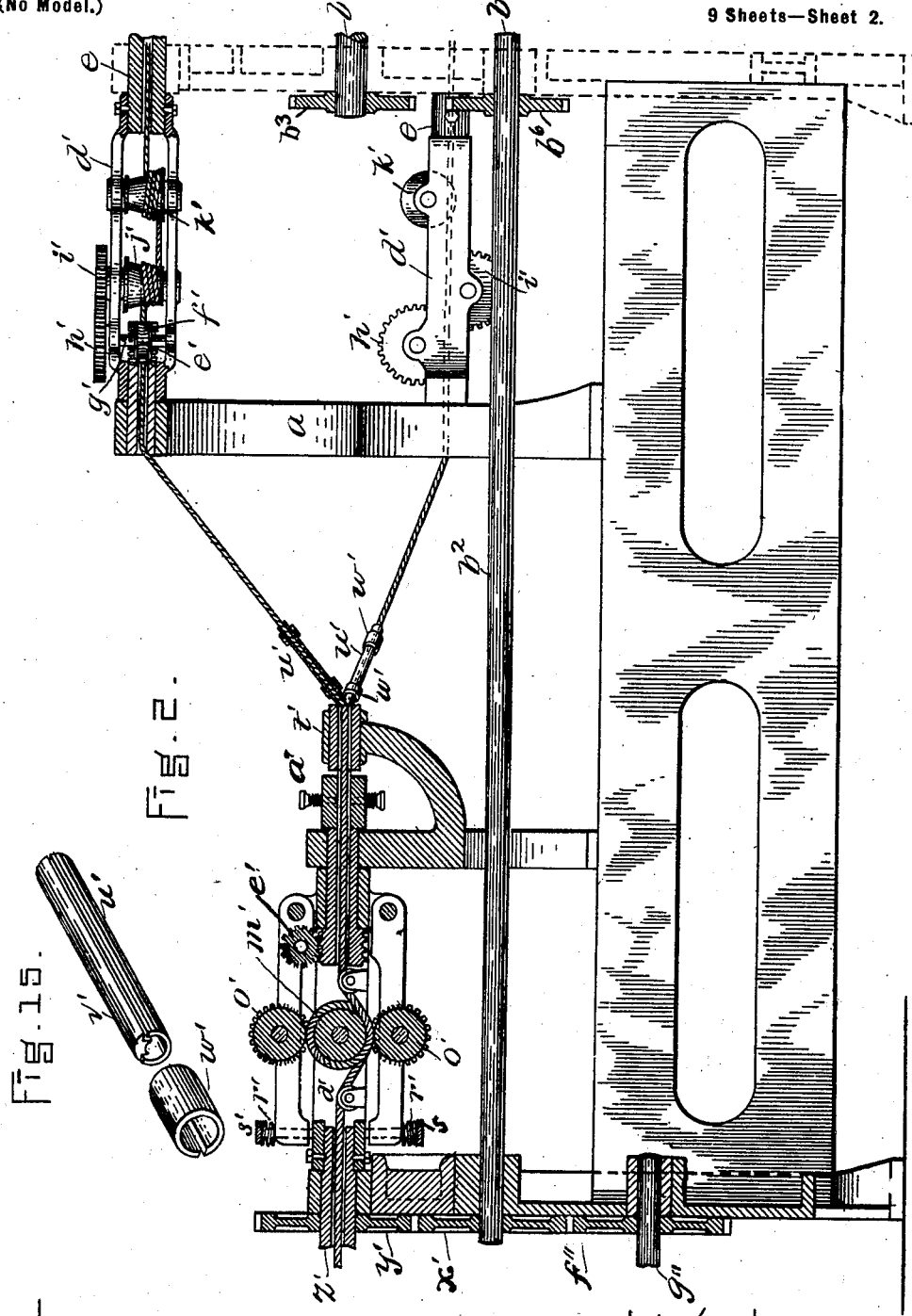

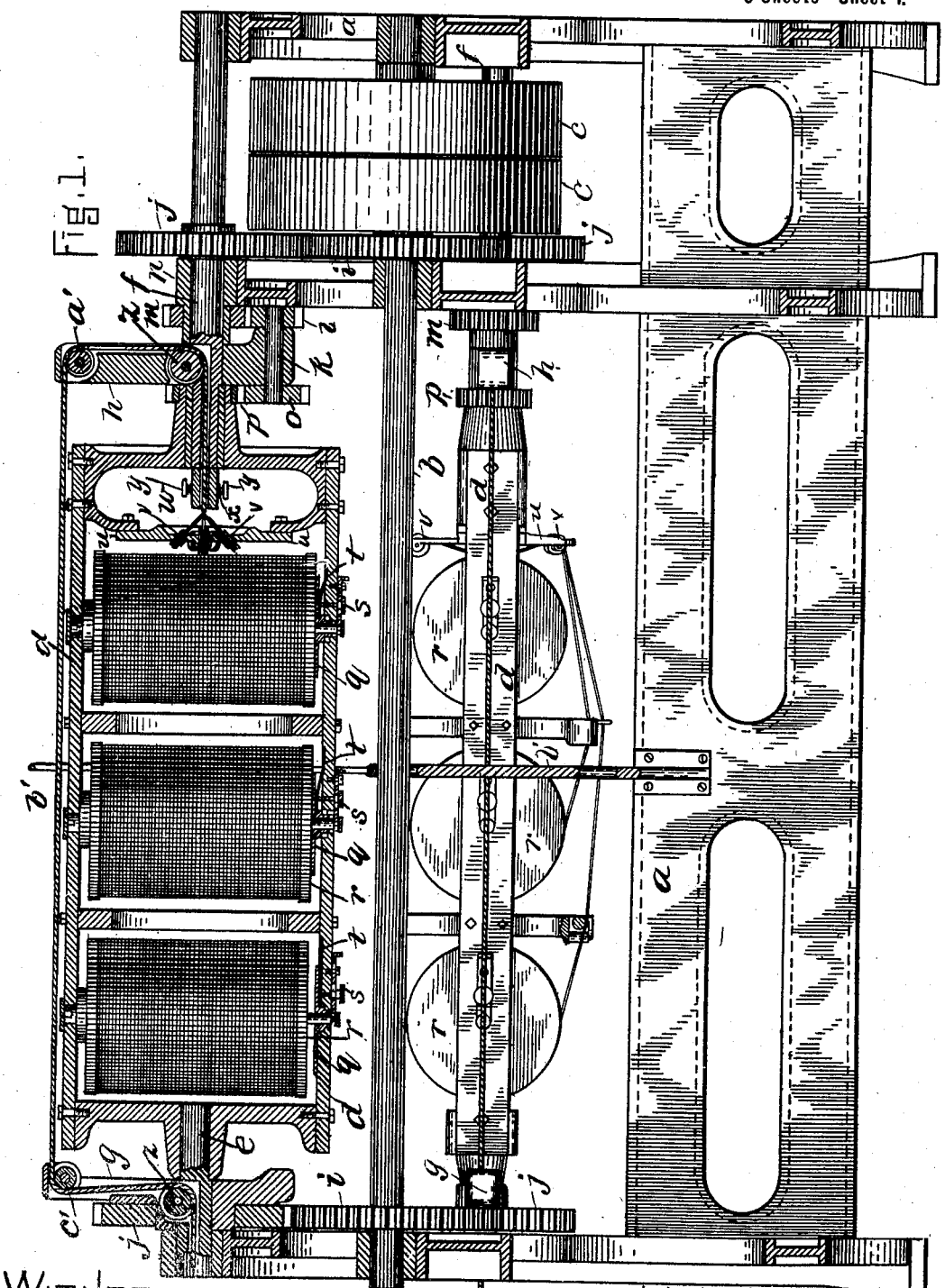

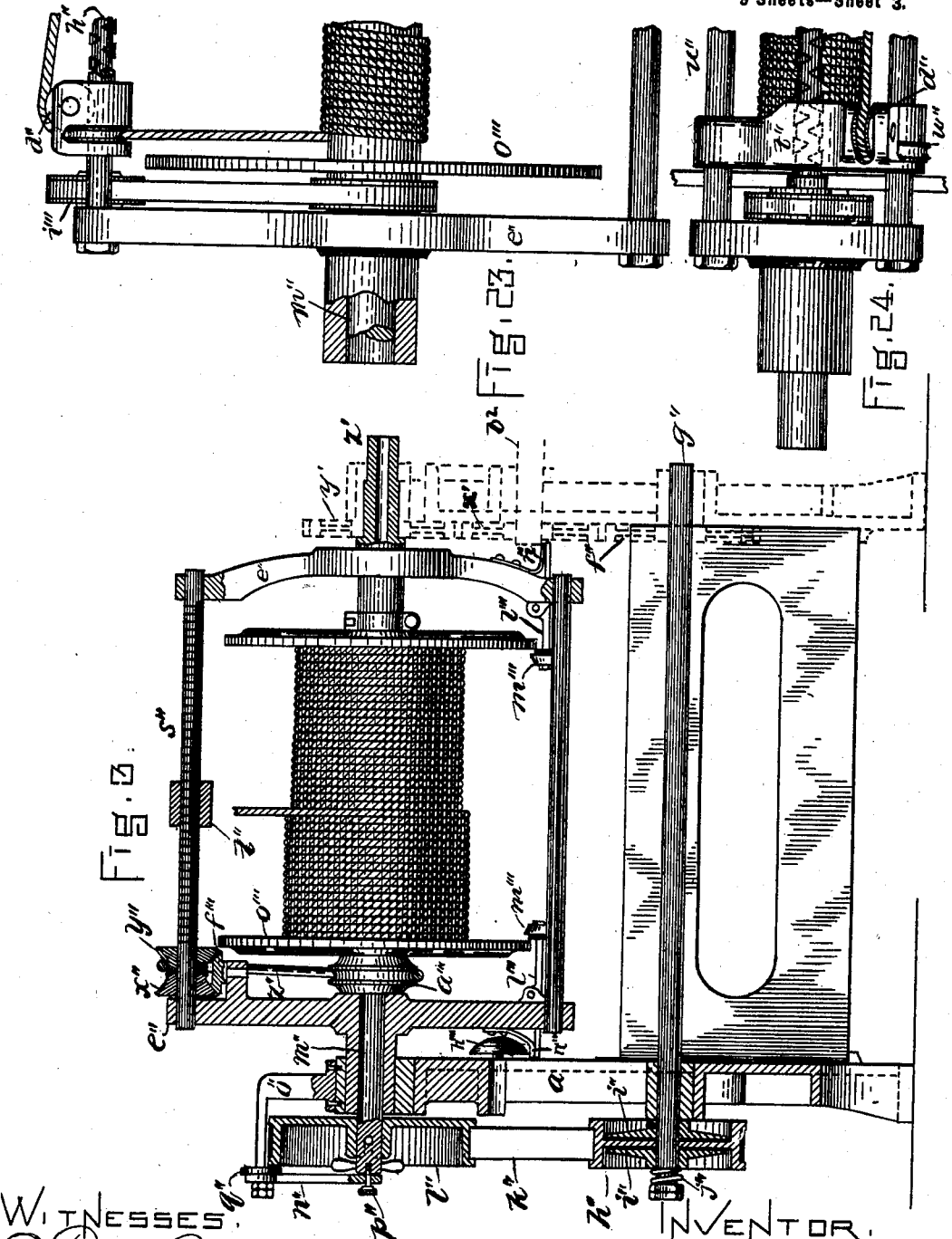

No. 691,797. Patented Jan. 28, 1902.
T. W. NORMAN.
MACHINE FOR MAKING ROPES.
(Application filed Mar. 16, 1891.)
(No Model.) 9 Sheets—Sheet 4.
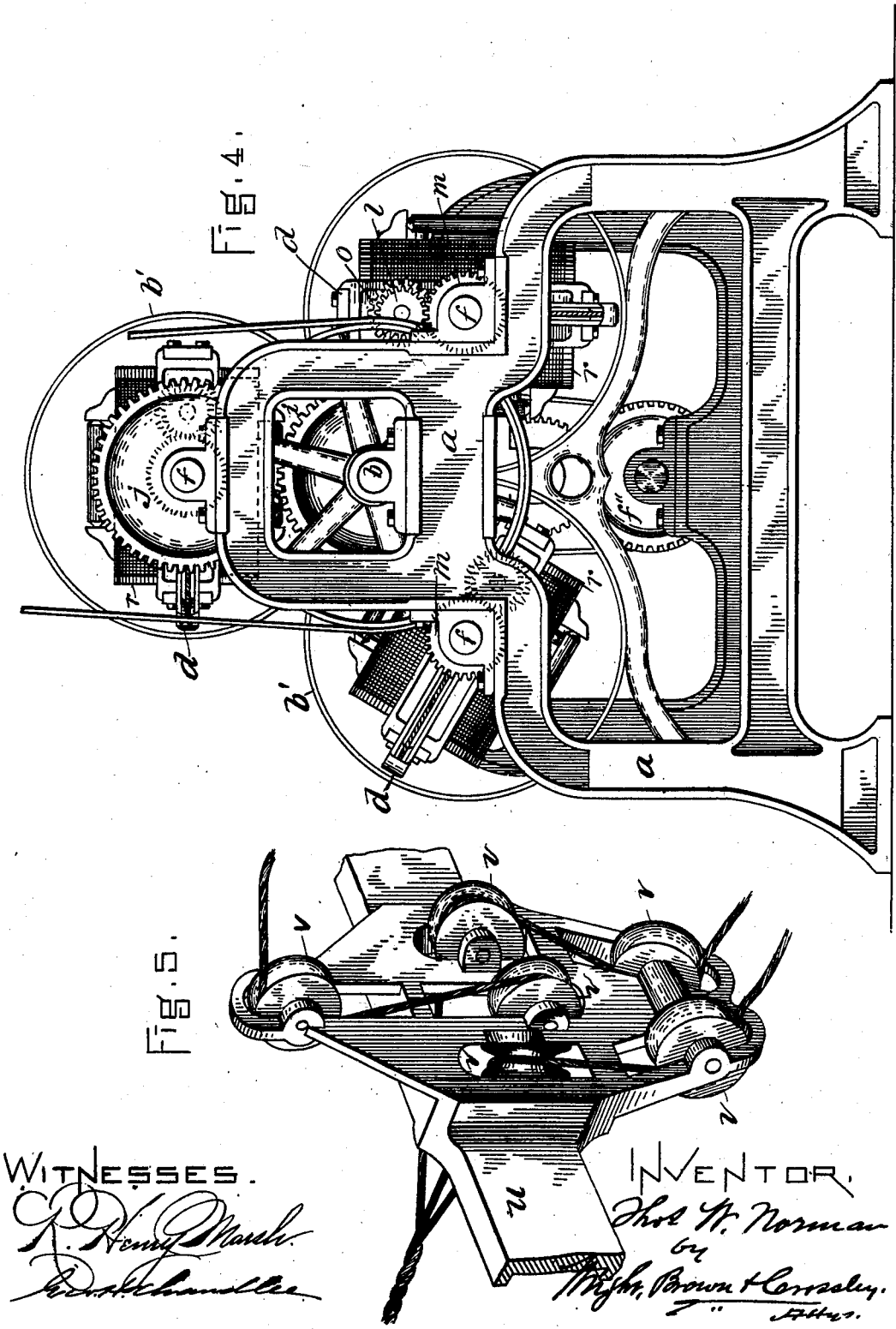

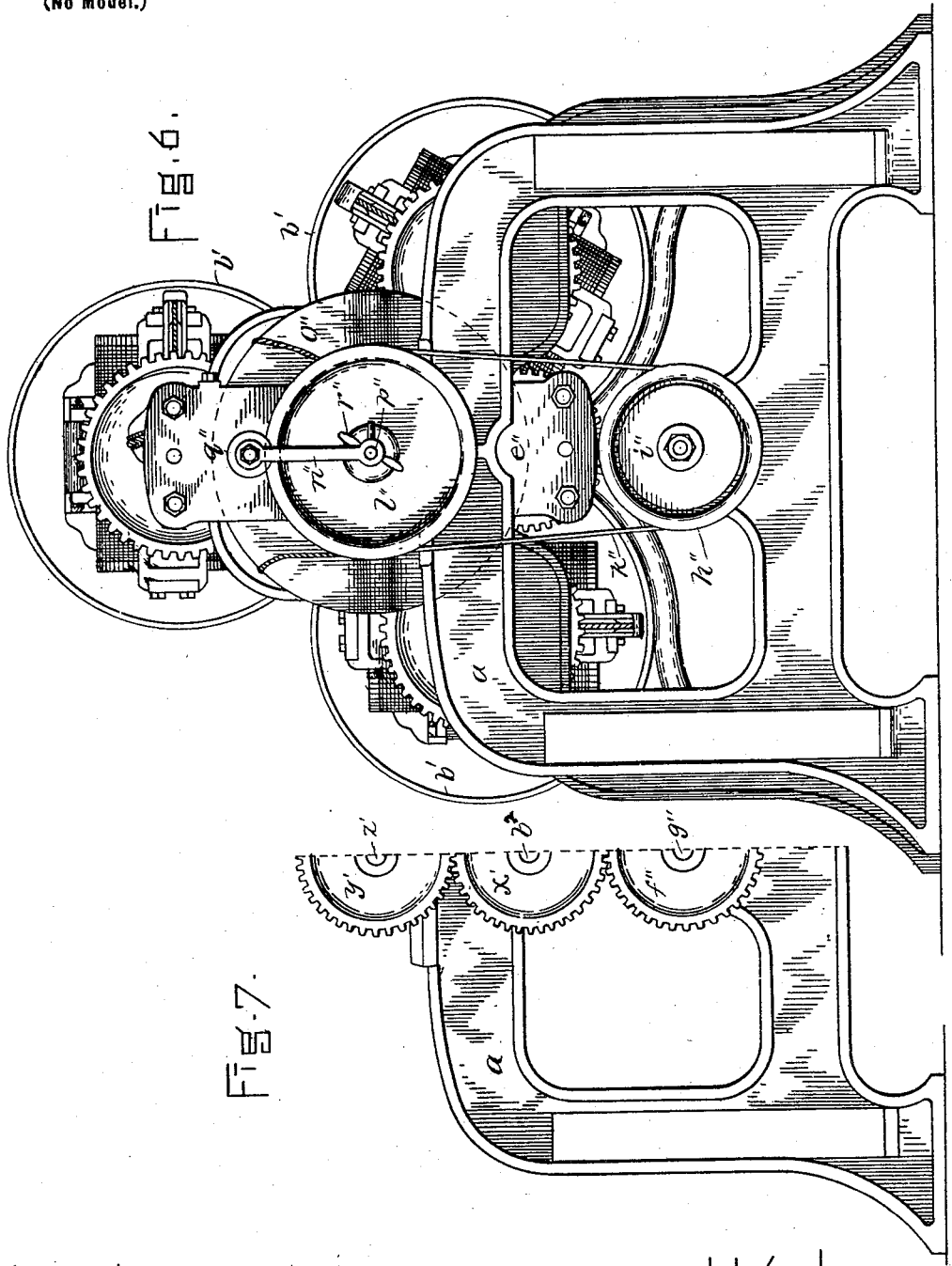

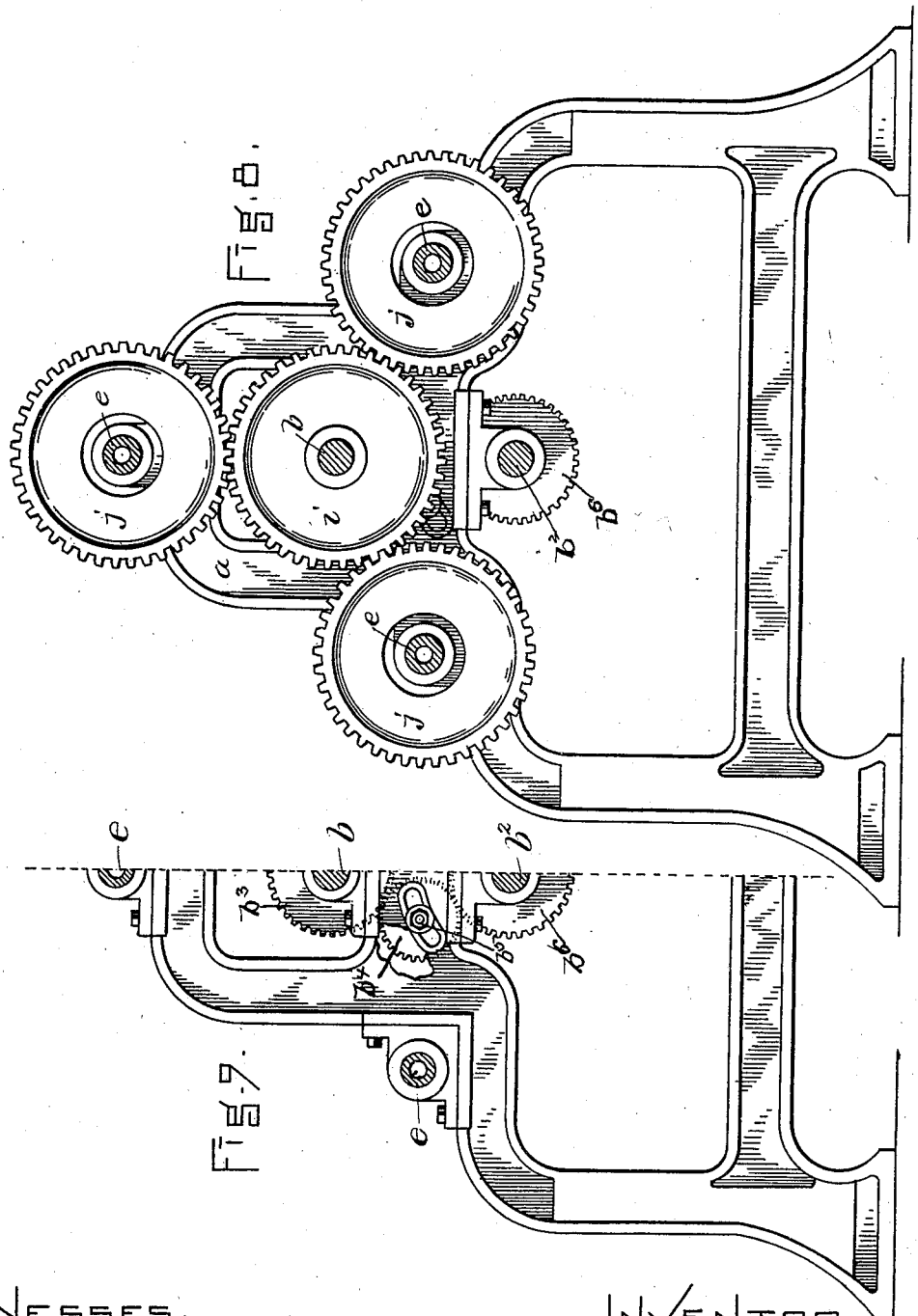

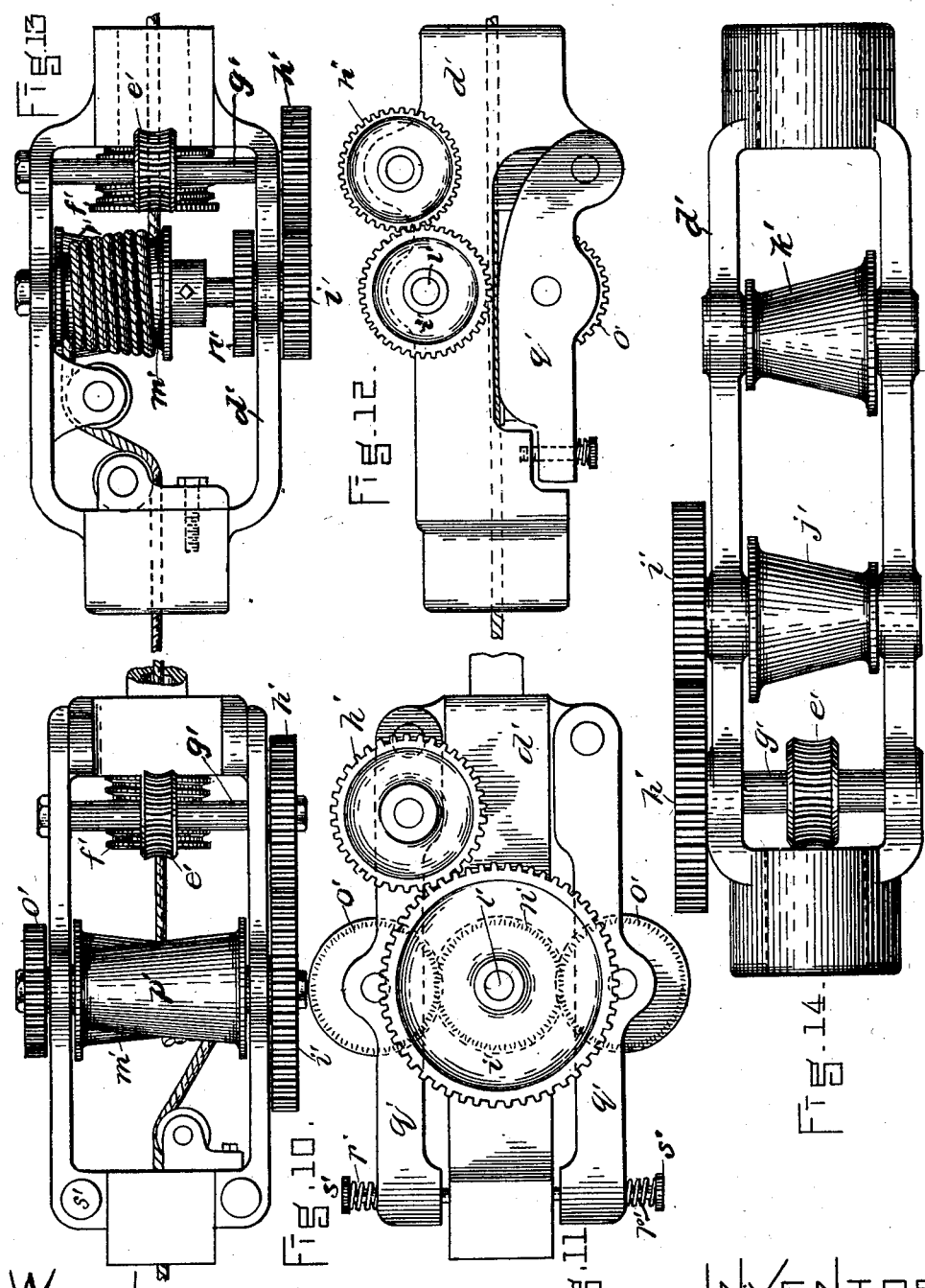

No. 691,797. Patented Jan. 28, 1902.
T. W. NORMAN.
MACHINE FOR MAKING ROPES.
(Application filed Mar. 16, 1891.)
(No Model.) 9 Sheets—Sheet 8.
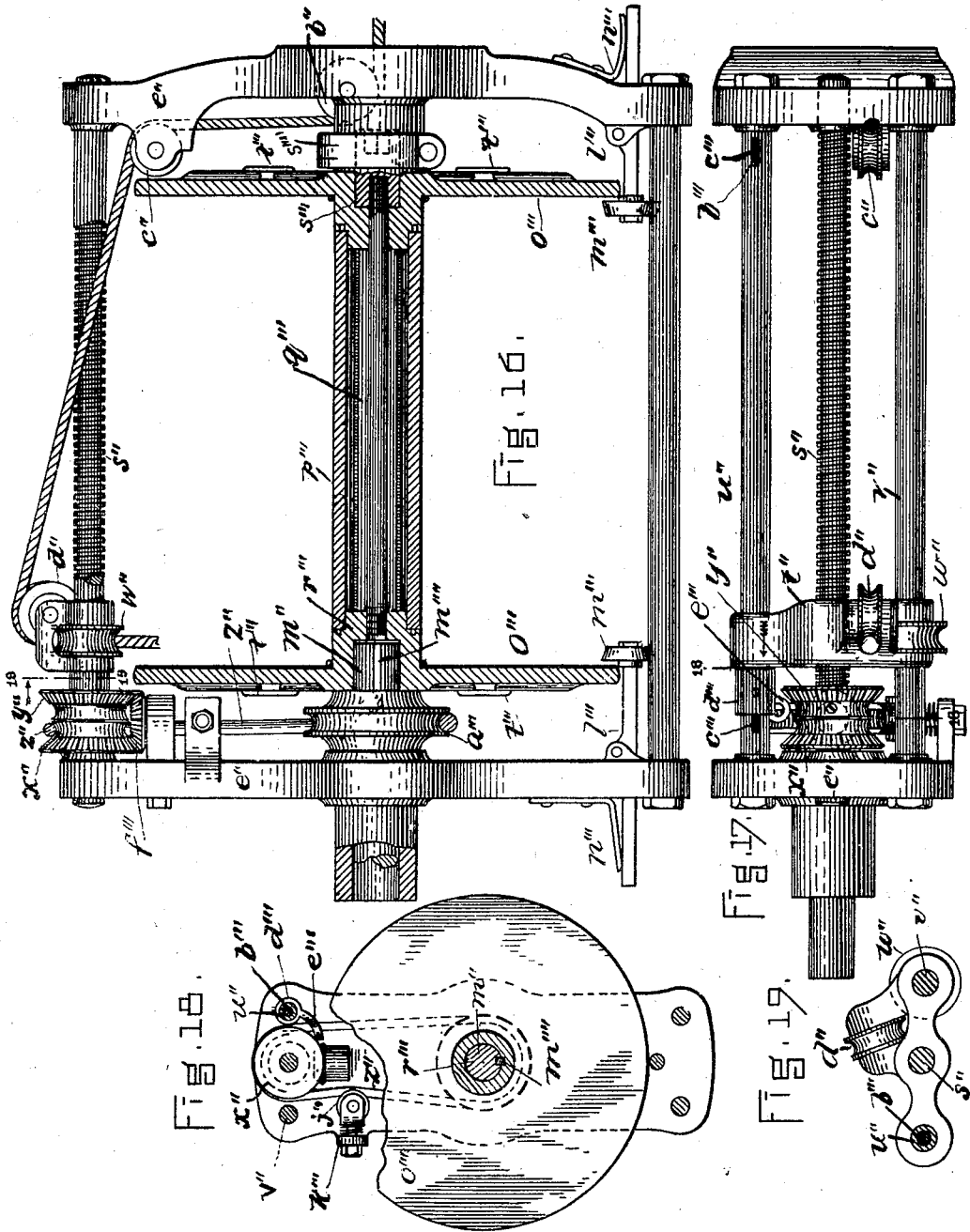

No. 691,797. Patented Jan. 28, 1902.
T. W. NORMAN.
MACHINE FOR MAKING ROPES.
(Application filed Mar. 16, 1891.)
(No Model.) 9 Sheets—Sheet 9.
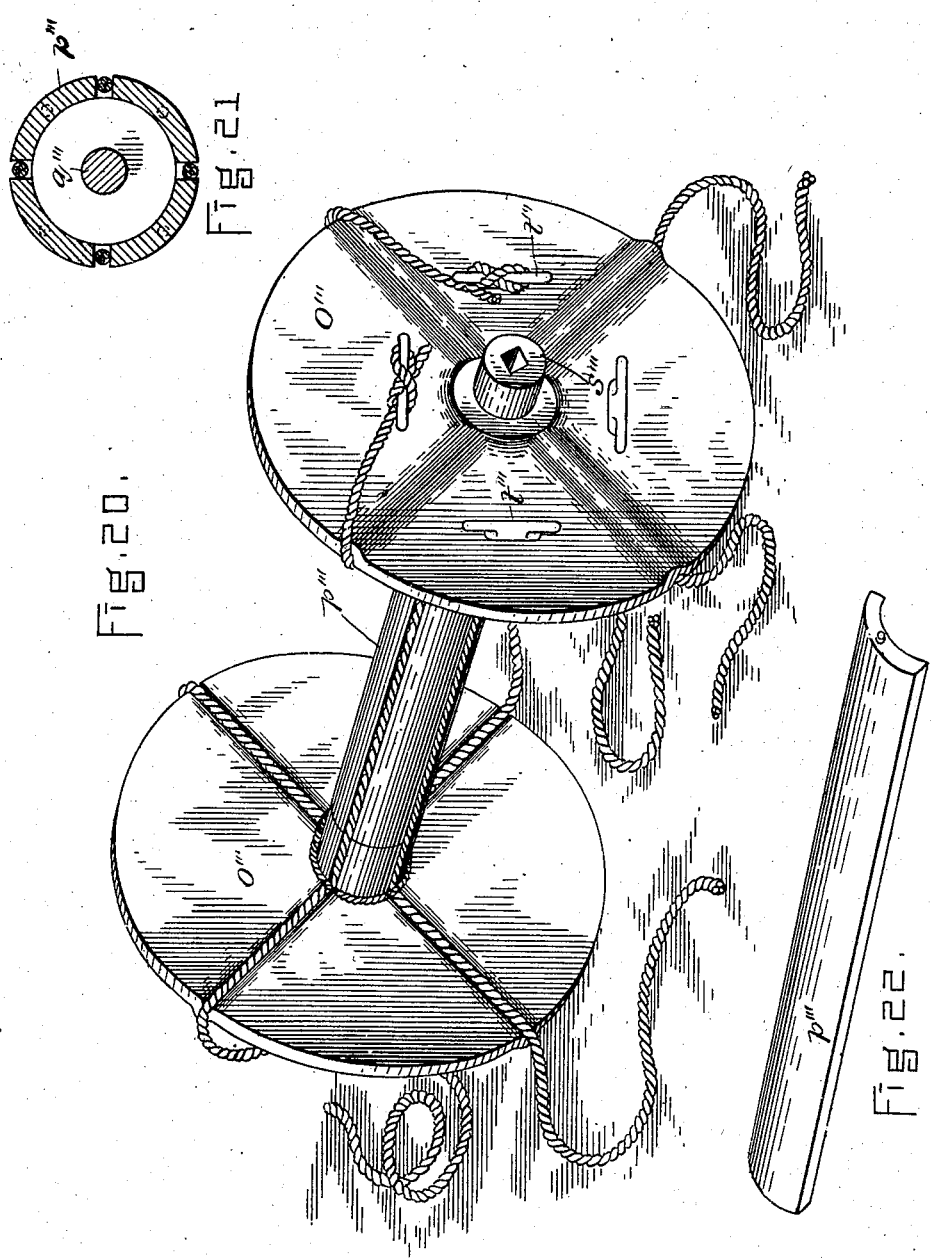

UNITED STATES PATENT OFFICE.

THOMAS W. NORMAN, OF BOSTON, MASSACHUSETTS.

MACHINE FOR MAKING ROPES.

SPECIFICATION forming part of Letters Patent No. 691,797, dated January 28, 1902.

Application filed March 16, 1891. Serial No. 385,186. (No model.)

*To all whom it may concern:*

Be it known that I, THOMAS W. NORMAN, of Boston, in the county of Suffolk and State of Massachusetts, have invented certain new and useful Improvements in Machines for Making Ropes, &c., of which the following is a specification.

My invention has relation to machines for twisting textiles into yarns, strands, cords, and ropes, though parts of the contrivance may be employed in the formation of wire cables and other manufactures, while still other parts may be used in the exercise of the art of winding or spooling.

It is the object of my invention to provide a machine of the kind mentioned which shall be simpler in construction and more efficient and serviceable than machines heretofore employed, and to this end I have reorganized and improved the machine throughout.

Reference is to be had to the annexed drawings, and to the letters and other marks of reference appearing thereon, forming a part of this specification, the same letters and marks designating the same parts or features, as the case may be, wherever they occur.

Of the said drawings, Figure 1 is a sectional elevation of the forward part of the machine, which in the present instance is organized to twist or lay up the cords or yarns into strands. Fig. 2 is a sectional elevation of the central part of the machine, which comprises the means for drawing down the strands, twisting or laying the same up into a cord or rope, and drawing down the rope to be reeled or spooled. Fig. 3 is a sectional elevation of the rearward end of the machine comprising the reeling or taking-up mechanism and its adjuncts. Fig. 4 is a front end elevation of the machine. Fig. 5 is a perspective view of the improved means for guiding the cords or strands to a common center to enable the same to be twisted or laid together. Fig. 6 is a rear end elevation of the machine. Fig. 7 is a diagram in end elevation of a portion of the means for operating the spooling or take-up means. Fig. 8 is a sectional end elevation of the gearing for operating the fliers. Fig. 9 is a similar view of a portion of the gearing just inward from the gearing shown in Fig. 8. Fig. 10 is a plan and Fig. 11 is a side view of one form of pull-down in which three capstans are employed, the outer capstans being held to operate upon the inner with a yielding pressure. Fig. 12 is a side and Fig. 13 is a plan view of another form of pull-down employing two capstans. Fig. 14 is a plan view of another form of pull-down employing two capstans, one of which is positively driven, and the other, employed as a feed, is constructed as an idler. Fig. 15 is a perspective view of the improved means for smoothing or laying the beard of the cord or rope. Fig. 16 is a side elevation, partly in section, of the spooling means. Fig. 17 is a top plan view of the devices shown in Fig. 16. Fig. 18 is a sectional detail taken on the line 18 18 of Fig. 17. Fig. 19 is a sectional detail taken on the line 19 19 of Fig. 16. Fig. 20 is a perspective view of the improved spool complete, with the bale-binding cords in place on the spool. Fig. 21 is a sectional view through the barrel of the spool. Fig. 22 is a perspective view of one of the segmental staves forming a part of the barrel of the spool. Figs. 23 and 24 are details of modified forms of means for laying the rope upon the take-up spool.

In the drawings, *a* designates the frame of the machine.

*b* is the main or driving shaft.

*c c* are pulleys on the main shaft for operation of the machine.

*d* designates the spool-carrying frames, which are journaled upon the shafts *e f* of the rotary hubs or disks *g h*, which are made to take the place of the usual outside flier.

To the shaft *b* is affixed a gear *i*, which engages and drives gears *j*, one on each of the shafts *f*. On the shaft *b* at the inner end of the flier-frame is a similar gear *i*, which meshes with and drives gears similar to gears *j* on the shafts *e* or connected with the disks or hubs *g*, so that the disks or hubs *g h* will be driven in unison.

In the hub or disk *h* is journaled a short shaft *k*, to one end of which is fixed a gear *l*, which meshes with a gear *m*, fixed upon the frame or bearing *n* of the shaft *f*. To the other end of the shaft *k* is affixed a gear *o*, which engages a gear *p* on the hub of the spool-carrying frame or flier, which construction and arrangement of gearing secures the rotation of the spool-frame or inside flier in one direction and hubs or disks $g$ $h$ in the other direction in proper time and manner to effect a double twisting of the cords or yarns led from the spools into strands.

$q$, Fig. 1, designates a friction-disk adapted to be pressed against the end of the spool $r$ by a screw $s$, bearing upon a spring $t$, one end of which is secured to the spool-frame and the other connected to the friction-disk in order to apply tension upon the yarn drawn from the spools. One of the advantages of this device is that when the screw $s$ is turned out the spring $t$ will act to cause the friction-disk $q$ to "respond" and release the tension correspondingly from the spool. Again, the spring when operated by screw $s$ serves to hold the friction-disk against the end of the spool with a somewhat-yielding pressure.

In order to avoid abrading or breaking the cords or yarns in guiding the same to a common center to be laid up into a strand or rope by passing the same through holes in a disk or in contact with stationary surfaces, I employ the device which is most clearly illustrated in Fig. 5, which consists of a frame or head $u$, in which is journaled a series of pulleys $v$, two pulleys being employed for each cord or yarn and each of each pair of pulleys being arranged at an angle with respect to the other, so that the pulley $v$ receiving the yarn from the spool may be in such position as that the yarn will not run off the same, but be guided to the second pulley, which is arranged in such position as to guide the yarn to a center common to all the other yarns, so that the same may be twisted or laid up into a rope or strand. This feature of the invention I regard as important, inasmuch as by it all liability of breaking yarns by reason of knots or bunches occurring therein is avoided, as also, as has been before stated, the abrading of the yarn is obviated, and in addition to this a more even tension upon the yarns comprising the strand can be secured than though the same were passed over a stationary or rigid surface. After the yarns have been laid up into a strand, as described, they pass through a "former" $w$, (shown in Fig. 1,) which is composed of two parts similar to a split tube, the parts being held together with a yielding pressure by means of springs $x$ acting between the heads of thumb-screws $y$ and the former, as shown.

I have provided the hubs or disk $g$ $h$ with pulleys $z$, arranged in their axes or shafts, around which the strand from the spools is led, first from the before-mentioned adjusted pulleys $v$ and former $w$, through the shaft $f$, under the pulley $z$, thence over a pulley $a'$ on the periphery of the disk or hub $h$, thence along under the antiballooning hoop $b'$, thence over pulley $c'$ in the periphery of the hub or disk $g$, thence around the pulley $z$ in the shaft or axis of the hub $g$, and thence through the shaft $e$ of said hub to the drawing-down device, to be presently described. This feature of providing the driving-shaft of the flier or disks $g$ $h$ with guiding-pulleys $z$ in their shafts or axes is also an important feature of the invention, since by it I am enabled to do away with double shafts and frame or outer flier, as in machines for making cords and ropes now commonly used.

The drawing-down device for the strands, as shown in Figs. 2 and 14, consists of a rotary frame $d'$, provided with a worm-gear $e'$ at its forward end, which is adapted to engage a stationary worm $f'$, sustained in the frame $a$, concentric with the axis of rotation of said frame, so that as said frame $d'$ revolves or is carried around the worm $f'$ by shaft $e$ the worm-gear $e'$ will be rotated. Upon the shaft $g'$ of the worm-gear $e'$ is affixed a gear $h'$, which engages a gear $i'$, affixed to a shaft upon which is secured a capstan $j'$, around which the strand coming from the twisting mechanism is wound several times. Before being wound upon the capstan $j'$ the strand is wound around an idler-capstan $k'$, which leads or guides it to the capstan $j'$.

With the means before described sufficient friction is produced upon the strands in their course around the capstans $j'$ $k'$ to draw the said strands from the twisting mechanism or flier-frames under proper tension, and the strands are drawn down with a positive motion by the rotation of the capstan $j'$ through the medium of the worm $f'$ and gears $e'$ $h'$ $i'$.

The gears $h'$ $i'$ are made removable, so that by varying their sizes the capstan $j'$ may be rotated at a faster or slower speed, so as to draw down the strands more or less rapidly, and providing for less or greater twist therein.

Instead of employing the drawing-down mechanism shown in Figs. 2 and 14, which has just been described, I may employ a drawing-down mechanism of a slightly-different form, as is shown in Figs. 10 and 11 and at the left in Fig. 2. In this instance the stationary worm $f'$ is employed as in the construction just hereinbefore described, and the frame $d'$, provided with a worm-gear $e'$, is revolved around the said worm in the same manner, the worm $e'$ operating the gears $h'$ $i'$ to effect the rotation of the shaft $l'$, upon which is affixed capstan $m'$. To the opposite end of the shaft $l'$ is secured a gear-wheel $n'$, (shown in dotted lines in Fig. 11,) which meshes with and operates similar gears $o'$, secured to the shafts of capstans $p'$ on the opposite sides of the capstan $m'$. The shafts of the capstans $p'$ are journaled in frames or bars $q'$, hinged at one end to the main frame $d'$ and at their opposite ends held to bear the capstans $p'$ upon the capstan $m'$ with a yielding pressure by means of springs $r'$, interposed between the heads of screws $s'$ and the bars $q'$, said screws $s'$ being tapped at their inner ends into the main frame $d'$, so that the cord or rope led from the flier-frame or from a previous pull-down may be wound around the capstan $m'$ and be pressed thereon, so as to induce friction and accurate results, by means of the capstans $p'$, constructed and arranged as before described; and instead of employing the construction just described, in which capstans $p'$ are arranged on opposite sides of the capstans $m'$, I may dispense with one of the capstans $p'$ and employ but one of the latter, which in some instances will be sufficient to produce enough friction upon the rope wound upon the capstan $m'$ to draw down the same positively. This modified form of device last referred to is represented in Figs. 12 and 13. In all instances, however, I employ the stationary worm $f'$ and the rotary frame provided with capstans, one or more of which is positively driven by means of a worm-gear $e'$, engaged by the worm $f'$, and which operates intermediate gears to drive the positively-rotated capstan, as before described, which gears may be interchangeable.

I have found in practice that the drawdown hereinbefore described is not only very efficient for the purpose for which it is intended, but it is simpler in construction than any device designed to perform a similar function that is now known to me.

In the machine as herein shown the strands after being drawn away from the twisting or flier frames by the "draw-down" are led to a former $a''$. Before reaching the former or frame-tube $t'$ the strands are led through a finishing or smoothing former $u'$, in the present instance consisting of a hollow-tube device of metal, porcelain, or other suitable material, as shown in Fig. 15, which tube is split or cut away at one side and provided with a wedge $v'$, inserted in such cut-away portion and having yielding or spring collars $w'$ arranged on the ends of said tubes in order to hold the wedge in place with a yielding pressure, so as to permit knots or bunches which may possibly occur in the strands to pass through the tubes without obstruction and without creating undue tension upon the strands. The thimbles or collars $w'$, as herein shown, consist of split sections of a steel tube of sufficient size to fit over the tubes $u'$ and wedge $v'$.

The object of the smoothing device just described is to lay or smooth down the "harl" or "beard," as it is technically termed, of the strands before the same are laid up into a rope, as in making jute, sisal, or Manila rope.

The strands are twisted into a rope at the frame-tube $t'$ by means of a rotary pull-down, such as has been hereinbefore described, which is operated by means of a gear $x'$ on shaft $b^2$, which gear $x'$ engages and drives a gear $y'$, fixed upon the journal-shaft $z'$ of the said rotary pull-down.

At the rear end of shaft $b$ is a gear $b^3$, (see Figs. 2 and 9,) meshing with a pinion $b^4$, mounted to turn freely on a stud $b^5$, secured to the frame of the machine. This pinion $b^4$ meshes with a gear $b^6$, secured to the front end of shaft $b^2$, which is thus driven by the shaft $b$.

As herein shown, the rotary pull-down is constructed of a positively-operated capstan $m'$, having capstans $p'$ bearing thereon on opposite sides of the first-mentioned capstan.

Before passing to the pull-down last described the rope is led through the former $a''$, similar to the former $w$, before described, through which the laid-up yarns or cords pass from the spools.

The gear $x'$ on driving-shaft $b^2$ meshes with gear $y'$, which rotates shaft $z'$ of flier-frame $e''$. From the pull-down device last mentioned the rope passes around pulleys $b''$, $c''$, and $d''$ in the flier $e''$ and is wound in regular close layers upon the take-up spool journaled in said flier. This part of my invention will next be described.

$f''$ designates a gear fixed to the inner end of a shaft $g''$, (see Figs. 2, 3, and 7,) which gear is engaged and driven by the gear $x'$ on shaft $b^2$. Upon the opposite end of shaft $g''$ is a pulley $h''$, frictionally attached to the said shaft by means of disks $i''$, bearing against the sides of its web with a yielding pressure by means of a spring $j''$, interposed between the hub of the outer disk $i''$ and a nut screwed upon the end of shaft $g''$. The hub of the inner disk is made fast to shaft $g''$ by means of a set-pin, while the outer disk is held by a spline (not shown) in the hub of the disk and in the shaft and near spring $j''$. Hence the two disks $i''$ will rotate positively with shaft $g''$, while the bearing or "web" of pulley $h''$ will slip frictionally between said disks $i''$, according to the requirements of the rope as it is wound on the take-up spool over pulley $d''$.

A belt $k''$ connects the friction-pulley $h''$ with a pulley $l''$ on the take-up-spool shaft $m''$. The said pulley $l''$ is connected with the spool-shaft by means of a pin in the latter entering a groove in the hub of the pulley $l''$, as shown, or it may be by means of a spline and groove. The pulley $l''$ is maintained in place upon the spool-shaft $m''$ by means of a catch-bar $n''$, swung at its upper end upon the projecting end of a bracket $o''$, connected with the frame $a$. A thumb-screw $p''$ extends through a hole in the lower end of the catch-bar $n''$ and is tapped into the end of the take-up-spool shaft $m''$, so that the pulley $l''$ can readily be secured in place on the shaft $m''$ or released to permit the withdrawal of the latter to an extent sufficient to disengage or release the take-up spool. A disk $q''$ on the projecting arm of bracket $o''$ serves to prevent the pulley $l''$ from following the shaft $m''$ when the latter is drawn outward, as it may be, by means of the handles $r''$ thereon. The inner end of spool-shaft $m''$ extends into the head of the take-up spool and is engaged therewith by means of a spline $m''''$, Figs. 16 and 18, so that the spool may be rotated by the rotation of the shaft $m''$.

It will be seen that the axis of the take-up spool and flier is the same—in other words, that the spool and flier extend in the same parallel plane and revolve upon the same axis, in contradistinction to the arrangement of spools and flier shown in Fig. 1, where the axis of the spools is at a right angle to the axis of the spool-frame.

It is to be noted that the pulley $h''$ is smaller than the pulley $l''$, so that while the take-up spool will be rotated in the same direction as the flier $e''$ is revolved it will be moved at a slower rate of speed, this difference in motion between the flier and take-up spool being established and employed for the purpose of winding the rope upon the spool. Now if the spool did not increase in diameter as it fills—that is, if at every rotation it took or wound up the same amount of rope—the spool could be driven at a fixed rate of speed with respect to the speed of the flier; but this is not the case, and as the rope is fed to the spool by the positively-operated capstan in the draw-down it becomes necessary that as the spool fills its speed relatively to the speed of the flier should be increased, and to effect a correct laying of the rope upon the spool the speed of the spool should be increased only when the direction of movement of the rope-laying means is reversed to lay an additional series or course of layers on the spool, so that the speed of the spool relative to the speed of the flier will be uniform throughout each course of layers, but vary in the laying of each successive course.

The tendency of the pulleys $h''$ $l''$ and belt $k''$ to rotate the take-up spool at a slower rate of speed than that at which the flier revolves serves simply as a drag upon the latter or to put the spool under tension, the draft of the rope on the spool being its actual rotating means, and hence the speed of the spool relatively to the speed of the flier will be governed by the speed at which the rope is fed thereto whether the spool be nearly empty or nearly full. The slippage of the pulley $h''$ between the friction-disks $i''$ permits of this varying speed of the spool relatively to the speed of the flier.

The varying of the speed of the spool in order to effect a proper take-up or winding on of the rope renders it necessary that the traverse of the rope-laying device should vary accordingly in order that the rope may be wound upon the spool in regular close layers or coils throughout. To secure this end I utilize the variation of the speed between the flier and spool to govern the traverse of the rope-laying device, so that when the flier revolves much faster than the spool the rope layer will be traversed comparatively fast, and when the speed of the spool relatively to the speed of the flier increases the traverse of the rope layer, or it may be of the spool where the rope layer is stationary, will be slowed down and, as before stated, the speed of the spool relatively to the speed of the flier is by my invention changed only at the time the direction of movement of the rope-laying device is changed to lay an additional course of layers on the spool, so that each course or series of layers will be wound upon the spool without any change in the speed of the latter relatively to the speed of the flier. This important feature of my invention I have accomplished by various means, certain only of which are shown herein.

Referring to Figs. 3 and 16 to 19, inclusive, $s''$ designates a screw-shaft journaled in bearings in the flier-frame $e''$, which engages the rope-laying device $t''$, guided by the bars $u''$ $v''$. The rope-laying device carries the pulleys $d''$ and $w''$, the rope passing over the former and under the latter to the take-up spool. Upon the screw-shaft $s''$ are two bevel-gears $x''$ $y''$, the former being loose upon the said shaft and the latter rigidly secured thereto. These gears are provided with hubs constructed as pulleys adapted to receive a belt $z''$, passed thereover and over a pulley $a'''$ on shaft $m''$ and connected to said shaft by spline $m''''$, which also connects the take-up spool with the said shaft. The guide bar or rod $u''$ is made hollow or constructed as a tube, in which is placed a rod $b'''$, having upturned ends which extend through slots $c'''$, the upturned end adjacent to the bevel-gears $x''$ $y''$ being connected with a collar $d'''$, which collar is in turn connected with a fork or loop $e'''$, which engages the belt $z''$, as is most clearly shown in Figs. 17 and 18.

$f'''$ is a bevel-gear having a suitable bearing in a bracket of the flier-frame and arranged to be engaged by the bevel-gears $x''$ $y''$, so as to communicate the motion imparted from one to the other.

Supposing now that the belt $z''$ is upon the pulley-hub of gear $x''$, as shown in Fig. 16, the rotation of the take-up spool at a slower speed than the flier $e''$ to effect the winding on or taking up of the rope will communicate motion to the screw-shaft $s''$ through the medium of pulley $a'''$ and the gears $x''$ $f'''$ $y$, so as to cause the laying device to travel in the direction indicated by the arrow in Fig. 16 at such speed or in such time (being regulated as before described) as to lay the rope in close layers on the spool, Fig. 3, until the laying device comes in contact with the upturned end $b'''$ of the rod in the guide-bar $u''$, when it will move the said rod in the direction of the said arrow, shipping the belt $z''$ from the pulley-hub of gear-wheel $x''$ to the pulley-hub of the gear-wheel $y''$, thereby reversing the direction of rotation of the said screw-shaft, it being driven directly by pulleys $a'''$ $y''$ and belt $z''$, immediately increasing the speed of spool, the rope now traversing over its former layer and causing the laying device to traverse in the direction of the arrow, Fig. 17, placing at a somewhat slower speed another layer of closely-wound rope on the spool until the traversing device reaches the collar $d'''$, when the belt $z''$ will be shipped back to its first position, the rotation of the screw-shaft be again reversed, and the operation described above be repeated.

By the means described the rate of traverse of the laying device will be governed wholly by the rate of rotation of the take-up spool as against the speed of the flier, so that the laying of the rope upon the spool in close layers will be assured, whether the rope be laid upon the bare barrel or upon a quite full spool. In other words, by the construction and mode of operation explained the relative differential motion between the flier and the take-up spool and its shaft combined with the screw-rod will always be maintained to secure the laying up of the rope in close uniform coils under substantially uniform tension, whether the rope be laid upon the bare spool-barrel or upon the next to the last layer of the bundle or spool of rope.

Instead of employing a single-threaded screw-shaft and reversing the rotation of the same, as before described, I may employ a double-threaded shaft $h'''$, Figs. 23 and 24, dispensing with the bevel-gears and the shipping of the belt $z''$ and lead the said belt over a pulley $i'''$ on the said shaft $h'''$, the well-known "crescent" traveler being employed to engage the double thread of the screw-shaft and effect the traverse of the laying device. In this case also the speed of the take-up spool with respect to the flier $e''$ also governs the rate of travel of the laying device.

When the bevel-gears and double pulleys are employed, I may use a belt-tightener, as shown in Fig. 18, to keep the belt taut. As shown, the belt-tightener consists of a pulley $j'''$ on the end of a spring-pressed rod, having bearings in a small bracket $k'''$, the said pulley engaging the belt, so as to allow it to expand in being shipped from one pulley-hub to the other, shown on gears $x''$ and $y''$, and also to keep the belt continually tight, thereby securing a perfect result in the laying of the rope on the take-up spool.

To adjust the speed from one thickness of rope to another it will be necessary only to remove pulley $a'''$ and replace one of the size desired accordingly.

Upon the flier at each end are pivoted two levers $l'''$, provided on their inner ends with rollers $m'''$, which extend just inside of the flanges or ends of the take-up spool, (see Figs. 3 and 16,) springs $n'''$ serving to keep the inner ends of said levers up into contact with or nearly into contact with the spool. With this construction and arrangement of parts when the spool becomes filled the layer or coil of rope thereon will engage the rollers $m'''$ and push the inner ends of the levers outward and their outer ends in the opposite direction, so as to ring a bell or trip a stopping mechanism, and thus enable the operative to remove the full spool and replace it with an empty one.

In Fig. 3 a bell is represented at $l''''$, secured to the frame in such position that one end of the lever $l'''$ will strike it when the roller $m'''$ is pushed outward by the outer layer or coil of rope.

In order that the rope coiled upon the take-up spool may be removed therefrom and "bundled" and maintained in the form in which it is wound upon the spool, I may form the latter with a collapsible barrel and with other features, as I will now proceed to explain.

$o'''$ designates the flanges or spool-heads, the barrel or shank between which is made up of a plurality of bars $p'''$ having the form of a segment of a circle in cross-section. $q'''$ is an iron rod extending through the barrel and screwed into the hub $r'''$ of one spool-head and into a separate nut or hub $s'''$ of the other head, thereby forcing or drawing one spool-head toward the other and against the ends of the bars $p'''$ and holding the latter in place. (See Figs. 16, 20, and 22.) The nut or hub $s'''$ is held in the flier-frame by a clasp $s''''$, as shown in Fig. 16, the hub of the other spool-head being splined on the shaft $m''$. (Also shown in Fig. 18.) A space may be left between each two bars $p'''$ to admit of a binding-rope being laid therein and in grooves in the inner faces of the heads of the take-up spool and made fast to cleats $t'''$ on the same, as shown in Figs. 20 and 21, so that when a spool becomes filled it may be removed from the machine, the nut or hub $s'''$ turned off the rod $q'''$, the flanges removed, and the sectional barrel of the spool allowed to collapse and be removed, the binding-rope having first been tied upon the rope on the spool to keep the coil in place.

Having thus explained the nature of my invention and described a way of constructing and using the same, though without attempting to set forth all of the forms of the invention, I declare that what I claim is—

1. The combination, with a plurality of spools and their supporting and carrying frame, of a guide for the yarns or cords drawn from the spools, consisting of a frame or head $u$ connected with the spool-frame, pairs of pulleys, (one pair for each of said yarns or cords) supported in the frame $u$, one pulley of each pair being arranged at a distance from the center of its frame, and the other pulley of each pair being centrally arranged in its frame at an angle to the first-mentioned pulley of each pair.

2. The combination, with a plurality of spools and their supporting and carrying frame, of a guide for the yarns or cords drawn from the spools, consisting of a frame or head $u$ connected with the spool-frame, pairs of pulleys, (one pair for each of said yarns or cords) supported in the frame $u$, one pulley of each pair being arranged at a distance from the center of its frame, and the other pulley of each pair being centrally arranged in its frame at an angle to the first-mentioned pulley of each pair and a former $w$ located substantially opposite the center of the frame $u$.

3. A guide for yarns or cords in a rope-making machine consisting of a frame or head $u$, pairs of pulleys (one for each yarn or cord) supported in the said frame, one pulley of each pair being arranged at a distance from the center of the frame, and the other pulley of each pair being centrally arranged in the frame at an angle to the first-mentioned pulley of each pair.

4. The combination, with the rotary spool-carrying frame or flier, of a guide for the yarns or cords and a laying-head or former at one end of and within the flier, the latter being provided with a hollow shaft beyond the inner end of which the yarn-guide and former are located as described, and the rotary disks $g$ $h$, having hollow shafts or hubs, and located beyond the ends of the flier and provided with the pulleys $z$ $z$ and $a'$ $c'$ arranged and operating substantially as shown and described, and gearing for operating the flier and disks.

5. A pull-down consisting of a revolving frame, a stationary worm around which the frame revolves, said worm being arranged to extend on a line concentric with the axis of rotation of the frame; a worm-gear $e'$ carried by the frame, engaging said worm, and revoluble around the same; a rotary capstan $m'$, and operative gearing connecting the same with the worm gear; a capstan $p'$ arranged to bear upon the capstan $m'$ with a yielding pressure, as described; and operative gearing intermediate of the capstans $m'$ and $p'$.

6. The combination with the take-up spool and flier, of the spring-pressed levers $l'''$ supported by the flier and provided with rollers $m'''$ which extend inside of the flanges of the take-up spool, and an alarm adapted to be operated by the said levers when the rollers are pressed outward, as set forth.

In testimony whereof I have signed my name to this specification, in the presence of two subscribing witnesses, this 10th day of March, A. D. 1891.

THOMAS W. NORMAN.

Witnesses:
ARTHUR W. CROSSLEY,
C. F. BROWN.